(12) United States Patent
Dinakaran et al.

(10) Patent No.: US 11,026,151 B2
(45) Date of Patent: Jun. 1, 2021

(54) DETERMINING TOP N DEVICES FOR LABELS

(71) Applicant: Hewlett Packard Enterprise Development LP, Houston, TX (US)

(72) Inventors: Vimal Dinakaran, Chennai (IN); Vijayaguru Guruchave, Chennai (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/043,419

(22) Filed: Jul. 24, 2018

(65) Prior Publication Data

US 2020/0037224 A1    Jan. 30, 2020

(51) Int. Cl.
| | |
|---|---|
| *H04L 12/00* | (2006.01) |
| *H04W 40/04* | (2009.01) |
| *H04L 12/24* | (2006.01) |
| *H04L 12/723* | (2013.01) |
| *H04L 12/911* | (2013.01) |
| *H04L 12/26* | (2006.01) |
| *G06F 11/34* | (2006.01) |
| *G06F 9/50* | (2006.01) |

(Continued)

(52) U.S. Cl.
CPC .......... *H04W 40/04* (2013.01); *G06F 9/5072* (2013.01); *G06F 11/3409* (2013.01); *H04L 41/0893* (2013.01); *H04L 43/08* (2013.01); *H04L 45/14* (2013.01); *H04L 45/507* (2013.01); *H04L 47/78* (2013.01); *H04L 45/02* (2013.01)

(58) Field of Classification Search
None
See application file for complete search history.

(56) References Cited

U.S. PATENT DOCUMENTS

| | | |
|---|---|---|
| 7,148,895 B2 | 12/2006 | Konishi et al. |
| 7,739,275 B2 | 6/2010 | Dubinko et al. |
| 7,979,439 B1 | 7/2011 | Nordstrom et al. |

(Continued)

FOREIGN PATENT DOCUMENTS

WO    WO 2011/142026 A1    7/2013

OTHER PUBLICATIONS

Butters, "Time Series Reduction", Sabisu, http://www.sabisu.co/wp-content/uploads/2015/05/time-series-reduction.pdf, vol. 1.0, 2014, 9 pages.

(Continued)

*Primary Examiner* — Noel R Beharry
*Assistant Examiner* — Lionel Preval
(74) *Attorney, Agent, or Firm* — Brooks, Cameron & Huebsch, PLLC (57) ABSTRACT

In some examples, a method can include applying a respective label of a plurality of labels to a network device of a plurality of network devices on a network; determining a respective amount of a performance attribute over a period of time for each client device associated with the network devices; generating an implicit data heap structure of top N client devices across a plurality of distributed processes for each label of the plurality of labels; determining, based on an implicit data heap structure, a client device having the greatest amount of the performance attribute over the period of time for a label of the plurality of labels; and displaying a client identifier of the client device having the greatest amount of the performance attribute.

16 Claims, 6 Drawing Sheets

(51) Int. Cl.
*H04L 12/721* (2013.01)
*H04L 12/751* (2013.01)

(56) References Cited

U.S. PATENT DOCUMENTS

| | | | |
|---|---|---|---|
| 9,538,401 B1* | 1/2017 | Ouyang | H04W 24/02 |
| 9,886,445 B1* | 2/2018 | Gupta | G06F 16/1744 |
| 2011/0145657 A1* | 6/2011 | Bishop | G06F 11/3495 |
| | | | 714/47.1 |
| 2015/0067819 A1* | 3/2015 | Shribman | H04L 65/4084 |
| | | | 726/12 |
| 2018/0109546 A1 | 4/2018 | Kirner et al. | |

OTHER PUBLICATIONS

Taiyeong, "Feature Extraction Methods for Time Series Data in SAS Enterprise Miner", support.sas.com/md/app/data-mining/enterprise-miner/papers/2014/fetimeseriesem2014.pdf, 2014, 14 pages.

* cited by examiner

DETERMINING TOP N DEVICES FOR LABELS

BACKGROUND

A network device and/or a client device can operate in accordance with a wireless specification. A wireless specification such as those created by the Institute of Electrical and Electronics Engineers (IEEE) local area network (LAN)/metropolitan area network (MAN) Standards Committee (IEEE 802) provide media access control (MAC) and physical layer (PHY) specifications for implementing wireless local area network (WLAN) computer communication.

DETAILED DESCRIPTION

A network device can use an antenna to transmit and/or receive information. The information can be transmitted and/or received via a network. Client devices can communicate via the network with the network device. Similar to the network device, the client devices can include an antenna to transmit and/or receive information. As used herein, the term "antenna" refers to a device that converts electric power into radio waves, and/or vice versa.

Network devices and/or client devices may provide different performance attributes such as an amount of data usage, an amount of latency, and/or a packet drop rate, among other possible performance attributes. As such, it may be desirable to identify network devices and/or client devices that have a particular performance attribute. For instance, network devices and/or client devices that consume a great amount of data. However, a total number of network devices and/or client devices may be numerous, and/or the network devices and/or the client devices may be distributed across a network. Consequently, some approaches attempting to identify performance attributes of network and/or client devices such as those approaches that index data and/or those that add a tag to each time series of data (e.g., KAIROSDB) may be computationally intensive, time intensive, and/or may be limited to an individual process.

Accordingly, the disclosure is directed to determining top N devices for labels. As used herein, "top N devices" refers to a network device and/or a client device included in an implicit data heap that is the result of a top N function for a plurality of labels. For instance, top N devices can be determined by generating an implicit data heap structure of top N devices and determining, based on an implicit data heap structure, a device (e.g., a client device) having a particular amount (e.g., a greatest amount) of a performance attribute over a period of time for a plurality of labels.

Notably, determination of top N devices can occur across a plurality of distributed processes, in contrast to other approaches such as those employing indexing that may be limited to an individual process. Additionally, determination of top N devices can facilitate a faster time to solution and yet be less computationally intensive as compared to other approaches such those that index data and/or those that add a tag to each time series of data.

Figure 1:
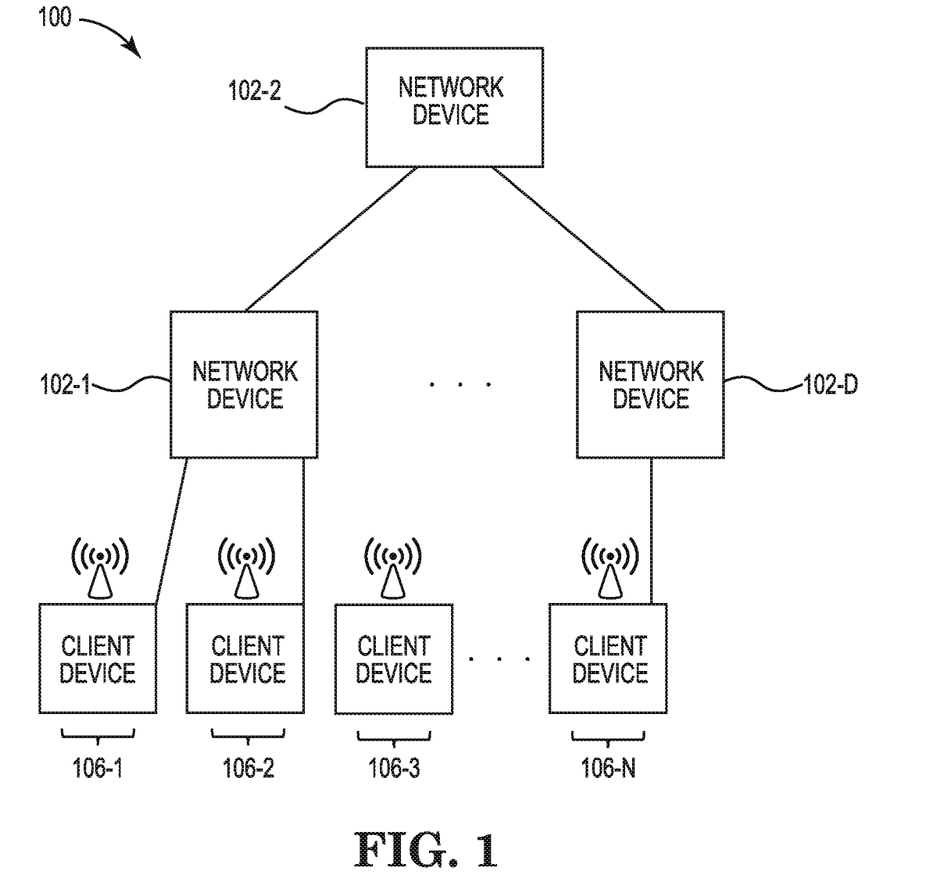
FIG. 1 illustrates an example of a network consistent with the disclosure.

FIG. 1 illustrates an example of a network 100 consistent with the disclosure. As illustrated in FIG. 1, the network layout 100 can include network devices 102-1, 102-2, ..., 102-D (referred to collectively as network devices 102), and client devices 106-1, 106-2, 106-3, ... 106-N (referred to collectively as client devices 106). As used herein, the term "network device" can, for example, refer to a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, network controllers, etc.) or the like.

In some examples, network devices 102 can include an access point (AP). An AP can refer to a networking device that allows a client device (i.e., a wireless client device) to connect to a wired or wireless network. As used herein, the term "access point" (AP) can, for example, refer to receiving points for any known or convenient wireless access technology which can later become known. Specifically, the term AP is not intended to be limited to IEEE 802.11-based APs. APs function as an electronic device that is adapted to allow wireless devices to connect to a wired network via various communications standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include a memory resource, including read-write memory, and a hierarchy of persistent memory such as ROM, EPROM, and Flash memory.

In some examples, network devices 102 can include a network controller. For example, network device 102-2 can be a network controller while network devices 102-1 and 102-D can be access points, among other possibilities. The network controller can include a processing resource such as a processing resource, memory, and input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. A network controller can include a memory resource, including read-write memory, and a hierarch of persistent memory such as ROM, EPROM, and Flash memory.

As used herein, the term "client device" can, for example, refer to a device including a processing resource, memory, and input/output interfaces for wired and/or wireless communication. For example, a client device can include a laptop computer, a desktop computer, a mobile device, and/or other wireless devices, although examples of the disclosure are not limited to such devices. A mobile device can, for example, refer to devices that are (or can be) carried and/or worn by a user. For instance, a mobile device can be a phone (e.g., a smart phone), a tablet, a personal digital assistant (PDA), smart glasses, and/or a wrist-worn device (e.g., a smart watch), among other types of mobile devices.

Client devices 106 can connect to network devices 102 via a network relationship. As used herein, the term "network relationship" can, for example, refer to a local area network (LAN), VLAN, wide area network (WAN), personal area network (PAN), a distributed computing environment (e.g., a cloud computing environment), storage area network (SAN), Metropolitan area network (MAN), a cellular communications network, and/or the Internet, among other types of network relationships.

Figure 2:
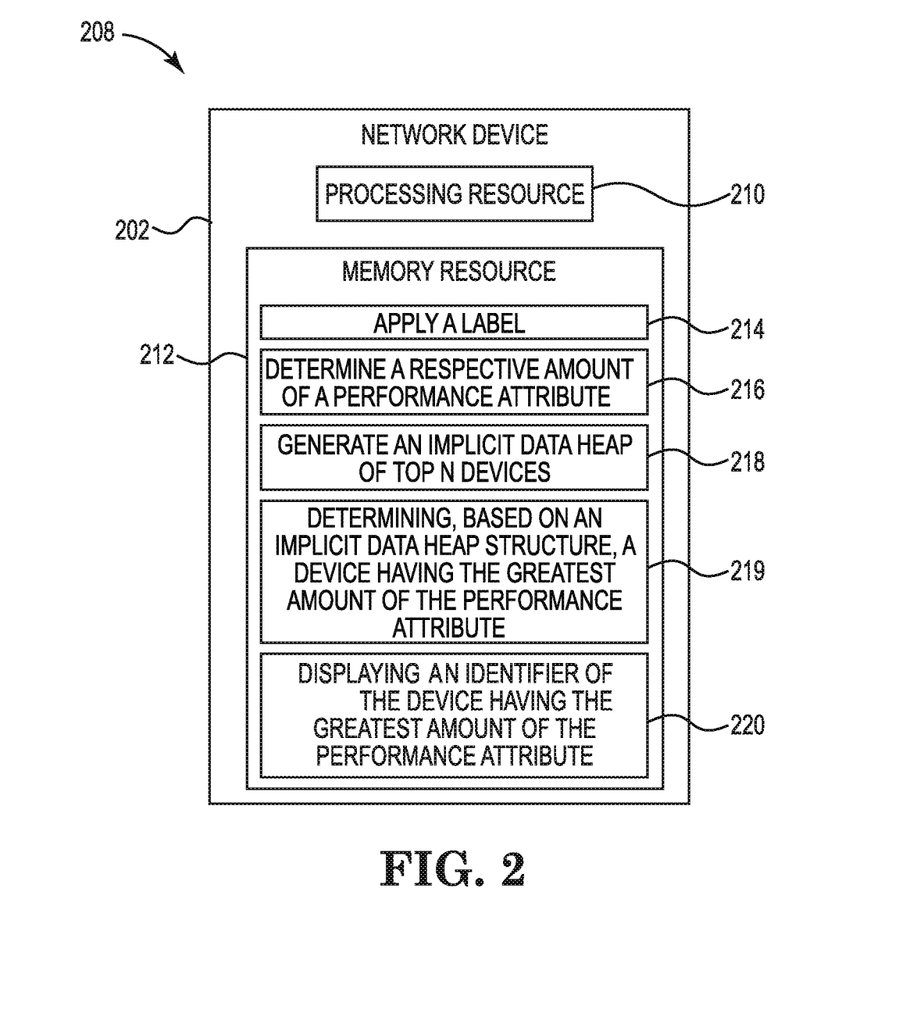
FIG. 2 is a block diagram of an example of a network device for determining top N devices for labels consistent with the disclosure.

FIG. 2 is a block diagram 208 of an example network device 202 consistent with the disclosure. As described herein, the network device 202 (e.g., a network device of the network devices 102, described in connection with FIG. 1) can perform a function related to determining top N devices for labels. Although the following descriptions refer to an individual processing resource and an individual machine-readable storage medium, the descriptions can also apply to a system with multiple processing resources and multiple machine-readable storage mediums. In such examples, the network device 202 can be distributed across multiple machine-readable storage mediums and the network device 202 can be distributed across multiple processing resources. Put another way, the instructions executed by the network device 202 can be stored across multiple machine-readable storage mediums and executed across multiple processing resources, such as in a distributed or virtual computing environment.

As illustrated in FIG. 2, the network device 202 can comprise a processing resource 210, and a memory resource 212 storing machine-readable instructions 214, 216, 218, 219, and 220 to cause the processing resource 210 to perform an operation relating to determining top N devices for labels. That is, using the processing resource 210 and the memory resource 212, the network device 202 can determine, based on an implicit data heap structure, a client device having an amount (e.g., the greatest amount) of a performance attribute over the period of time, among other operations. Processing resource 210 can be a central processing unit (CPU), microprocessor, and/or other hardware device suitable for retrieval and execution of instructions stored in memory resource 212.

While FIG. 2 describes instructions 214, 216, 218, 219, 220, with respect to the network device 202, some or all of the instructions 214, 216, 218, 219, 220, can be stored and/or executed in a distributed computing environment such as in a cloud infrastructure that can manage or otherwise interact with network devices and/or client devices. For instance, in various examples, network device 202 can determine performance attributes (e.g., bandwidth, channel noise, etc.) and send the determined performance attributes to a cloud computing environment. As detailed herein, the performance attributes can be sent periodically or otherwise to the distributed computing environment. In various examples, a management plane in the cloud computing environment can determine top N devices for labels, as detailed herein.

The network device 202 can include instructions 214 stored in the memory resource 212 and executable by the processing resource 210 to apply a label to a network device. For example, network device 202 can include instructions 214 stored in the memory resource 212 and executable by the processing resource 210 to apply a respective label of a plurality of labels to a network device of a plurality of network device on a network. In some examples, the instructions 214 can include instructions to apply a respective label of a plurality of labels to each network device of the plurality of network device on the network. The labels can be formed of numeric, alphabetic, symbols, and/or alpha-numeric characters, among other possibilities.

In some examples the labels can correspond to a group, a swarm, a site, different geographical areas in a site, a user role, and combinations thereof. For instance, a label can correspond to a group of network devices and/or client devices. As used herein, a "group" refers to a logical and/or physical grouping of network devices and/or physical devices. Similarly, a label can correspond to a swarm of network devices and/or client devices. As used herein, a "swarm" is defined as a set of cooperating digital devices communicating over a digital network. An example of a swarm is a group of wireless access points (WAPs) providing wireless services to client devices. Examples of different areas include different physical buildings, different floors or other areas in a respective physical building, among other possibilities. Examples of user roles include an administrator, an employee, a contractor, different levels of access and/or security permissions, among other user roles.

In some examples, the memory resource 212 can include instructions (not illustrated) to propagate a label from a network device to a client device associated with the network device. For example, a label can be applied to a network device and subsequently the label can be propagated to a client device associated with the network device. For instance, for each client device of a plurality of client devices across a plurality of distributed processes that are associated with network devices a label can be propagated from the network devices to respective client devices associated with the respective network devices. In such examples, a label can be applied to each client device and each network device on a network.

A representation of the applied label can be stored in a memory resource such as memory resource of the network device 202, a database and/or other type of storage resource such as in management plane in the distributed computing environment (a cloud computing environment). For instance, a representation (instructions corresponding to) an applied label can be stored in a table or other suitable format to maintain a correlation between the applied label and the network device and/or client devices that the label is applied to.

The network device 202 can include instructions 216 stored in the memory resource 212 and executable by the processing resource 210 to determine a respective amount of a performance attribute. For example, network device 202 can include instructions 216 stored in the memory resource 212 and executable by the processing resource 210 to over a period of time, determine a respective amount of a performance attribute of a plurality of network devices and/or a plurality of client devices associated with the network devices. That is, in some examples the instructions 216 can determine a performance attribute of a plurality of network devices, a plurality of client devices associated with the network devices, or both of a plurality of client devices associated with the network devices.

Examples of performance attributes include an amount of data usage, an amount of latency, a packet drop rate, or combinations thereof, among other possible performance attributes. As used herein an amount of latency refers to amount of time a packet takes to get from a designated point (e.g., an access point) to another destination (e.g., a client device). As used herein a packet drop rate refers to a percentage or other measure of an amount of packets or other form of information of a total number of packets over a period of time that are sent from a designated point (e.g., an access point) to another destination (e.g., a client device) but do not arrive at the destination. As used herein an amount of data usage can refer to an amount of data transmitted, an amount of data received, and/or a combined amount of data transmitted and received by a client device and/or a network device. That is, in some examples an amount of data refers to a combined amount of data equal to the sum of an amount of data transmitted (tx) and an amount of data received (rx) by a respective client device of a plurality of client devices and/or respective network device of a plurality of network device.

In some examples, the network device 202 can include instructions (not illustrated) to store respective amounts of the performance attribute as time series data. For instance, the performance attributes can be stored as time series data in a database. As used herein, time series data refers to a sequence of time stamped records occurring in a continuous stream that represents some type of information/activity. For instance, time series data can represent an amount of a performance attribute. In some examples, the instructions can include determining a respective amount of a performance attribute over a period of time for the times series data of each network device and/or each client device associated with a network device. However, in some examples, the instructions can include determining a respective amount of a performance attribute at a given point in time for the times series data of each network device and/or each client device associated with a network device.

The network device 202 can include instructions 218 stored in the memory resource 212 and executable by the processing resource 210 to generate an implicit data heap. For example, network device 202 can include instructions 218 stored in the memory resource 212 and executable by the processing resource 210 to generate an implicit data heap structure of top N client devices and/or network devices across a plurality of distributed processes for each label of a plurality of labels applied to the client devices and/or the network devices. As used herein, an "implicit data heap" refers to a tree-like data structure such as an array having inherent relationships between data storage locations (without use of pointers) to maintain the elements with the least/most performance attribute in its root. The implicit data heap can include little or no data in addition to the top N elements. For instance, in various examples herein the implicit data heap maintains the top N elements alone, without additional data.

In some examples an implicit data heap can be generated for top N network devices and/or client devices across a plurality of distributed processes. In such examples, an implicit data heap can be generated simultaneously across the plurality of distributed processes. For instance, generation of the implicit data heap can be initiated simultaneously across the plurality of distributed processes.

The network device 202 can include instructions 219 stored in the memory resource 212 and executable by the processing resource 210 to determine, based on the implicit data heap structure (generated at 218), a device having a greatest amount of the performance attribute over the period of time. For instance, the instructions 219 can include instructions to determine a client device and/or network device having a greatest amount of the performance attribute over the period of time for each label of the plurality of labels. While reference is made to determination of the "greatest" amount of a performance attribute it is understood that the disclosure is not so limited and rather that in some examples the instructions can determine a "least" amount of a performance attribute, among other possible amounts of a performance attribute. In some examples, the "greatest" or the "least" amount of a performance attribute may correspond to any amount that is greater or less than a threshold amount of the performance attribute. For instance, an individual value or a plurality of values (e.g., "greatest", "second greatest", etc.) can be returned as a "greatest' or "least" amount of a performance attribute. In some examples, the instructions 219 can determine, based on an implicit data heap structure, a set of client devices or a set of network devices having a greatest amount of the performance attribute over the period of time for a label of the plurality of labels, as detailed herein.

The network device 202 can include instructions 220 stored in the memory resource 212 and executable by the processing resource 210 to display an identifier of a device having the greatest amount of the performance attribute (as determined at 219). Displaying can include provide a visual representation of a network device and/or a client device such as client identifier, media access control (MAC) address, physical location, and/or other identifying information of a network device and/or client device. The visual representation can be displayed via a user interface or a client device, network device, and/or other device.

Figure 3:
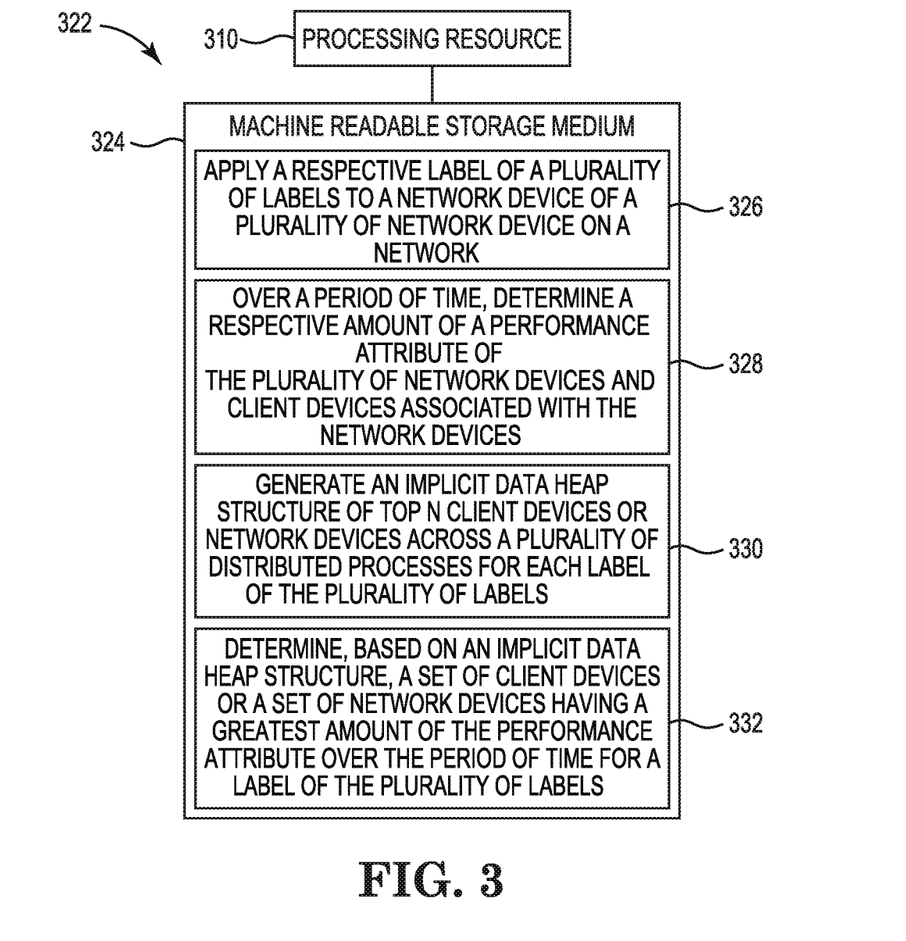
FIG. 3 is a block diagram of an example of a system consistent with the disclosure.
Figure 4:
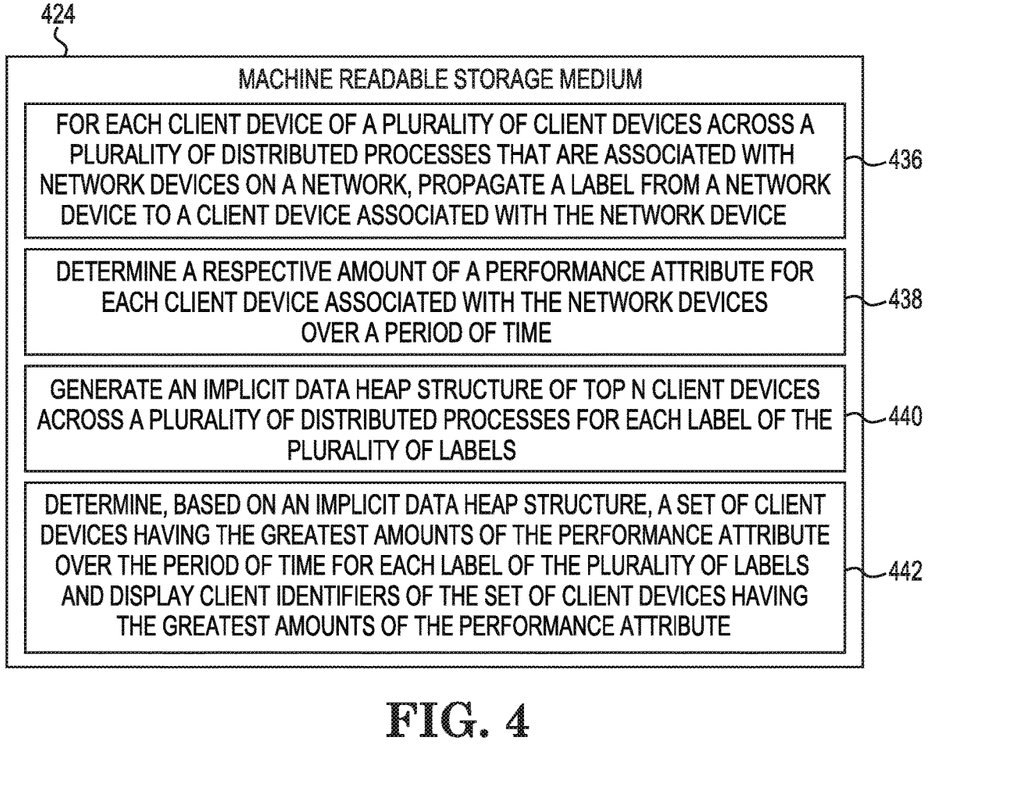
FIG. 4 is a block diagram of an example of a machine readable storage medium consistent with the disclosure.

FIG. 3 is a block diagram of an example of a system 322, consistent with the disclosure. System 322 can include a processing resource 310 (e.g., processing resource 210, described in connection with FIG. 2) and a machine-readable storage medium 324 (e.g., machine-readable medium 424 as illustrated in FIG. 4, respectively. Although the following descriptions refer to an individual processing resource and an individual machine-readable storage medium, the descriptions can also apply to a system with multiple processing resources and multiple machine-readable storage mediums. In such examples, the instructions can be distributed across multiple machine-readable storage mediums and the instructions can be distributed across multiple processing resources. Put another way, the instructions can be stored across multiple machine-readable storage mediums and executed across multiple processing resources, such as in a distributed computing environment.

Processing resource 310 can be a central processing unit (CPU), microprocessor, and/or other hardware device suitable for retrieval and execution of instructions stored in machine-readable storage medium 324. In the particular example shown in FIG. 3, processing resource 310 can receive, determine, and send instructions 326, 328, 330, and 332. As an alternative or in addition to retrieving and executing instructions, processing resource 310 can include an electronic circuit comprising an electronic component for performing the operations of the instructions in machine-readable storage medium 324. With respect to the executable instruction representations or boxes described and shown herein, it should be understood that part or all of the executable instructions and/or electronic circuits included within one box can be included in a different box shown in the figures or in a different box not shown.

Machine-readable storage medium 324 can be any electronic, magnetic, optical, or other physical storage device that stores executable instructions. Thus, machine-readable storage medium 324 can be, for example, Random Access Memory (RAM), an Electrically-Erasable Programmable Read-Only Memory (EEPROM), a storage drive, an optical disc, and the like. The executable instructions can be "installed" on the system 322 illustrated in FIG. 3. Machine-readable storage medium 324 can be a portable, external or remote storage medium, for example, that allows the system 322 to download the instructions from the portable/external/remote storage medium. In this situation, the executable instructions can be part of an "installation package". As described herein, machine-readable storage medium 324 can be encoded with executable instructions related to determining top N devices for labels.

Instructions 326, when executed by processing resource 310, can cause system 322 to apply a respective label of a plurality of labels to a network device of a plurality of network devices on a network, as described herein. For instance, the instructions 326 can apply a respective label to each network device of the plurality of network devices. The label can be applied responsive to a network device entering a network, periodically, and/or upon request such as request by an administrator of the network, among other possibilities.

Instructions 328, when executed by processing resource 310, can cause system 322 to over a period of time, determine a respective amount of a performance attribute of the plurality of network devices and/or client devices associated with the network devices, as described herein. Determining the respective amount of a performance capability of a device can be obtain based on information provide from the device and/or network traffic sent to and/or received from the device, among other possibilities. For instance, a respective amount of a performance capability can be determined or otherwise obtained from information in a message sent by a network device to a management plane of a distributed computing environment (e.g., a cloud computing environment). As used herein, the term "information" can, for example, refer to data, addresses, control, management (e.g., statistics) or any combination thereof, among other information. For data transmission, information can be transmitted as a message, namely a collection of bits in a predetermined format. A message such as wireless message can include a header and payload data having a predetermined number of bits of information. The wireless message can be placed in a format as a plurality of packets, frames or cells. In some examples, determining can include determining an amount of a performance characteristic based on information included in a management packet or other type of packet.

Instructions 330, when executed by processing resource 310, can cause system 322 to generate an implicit data heap structure of top N client devices and/or network devices across a plurality of distributed processes for each label of the plurality of labels, as described herein.

Instructions 332, when executed by processing resource 310, can cause system 322 to determine, based on an implicit data heap structure, a set of client devices or a set of network devices having a greatest amount of the performance attribute over the period of time for a label of the plurality of labels. In some examples, the instructions can periodically determine, based on an implicit data heap structure, a set of client devices or a set of network devices having a greatest amount of the performance attribute over the period of time for a label of the plurality of labels. However, the disclosure is not so limited. For instance, the instructions can determine a greatest amount of a performance attribute responsive to a user input and/or responsive to a network condition such as the addition/removal of a client device and/or a network device from the network, among other possible network conditions.

FIG. 4 is a block diagram of an example of a machine readable storage medium 424 consistent with the disclosure. The machine readable storage medium 424 can be analogous to or similar to machine readable storage medium 324. For instance, the machine readable storage medium 424 can include instructions that are executable by a processing resource such as those described herein to perform functions related to determining top N devices for labels.

In various examples, the machine readable storage medium 424 can include instructions 436, when executed by a processing resource, that can for each client device of a plurality of client devices across a plurality of distributed processes that are associated with network devices on a network, propagate a label from a network device to a client device associated with the network device. That is, as described herein as label can be applied to a network device and propagated from the network device to a client device.

In various examples, the machine readable storage medium 424 can include instructions 438, when executed by a processing resource, that can determine a respective amount of a performance attribute for each client device associated with the network devices over a period of time, as described herein.

In various examples, the machine readable storage medium 424 can include instructions 440, when executed by a processing resource, that can generate an implicit data heap structure of top N client devices across a plurality of distributed processes for each label of the plurality of labels, as described herein.

The machine readable storage medium 424 can include instructions 442, when executed by a processing resource, that can determine, based on an implicit data heap structure, a set of client devices having the greatest amounts of the performance attribute over the period of time for each label of the plurality of labels, as described herein. The instructions 442, when executed by a processing resource can further display client identifiers of the set of client devices having the greatest amounts of the performance attribute, as described herein.

Figure 5:
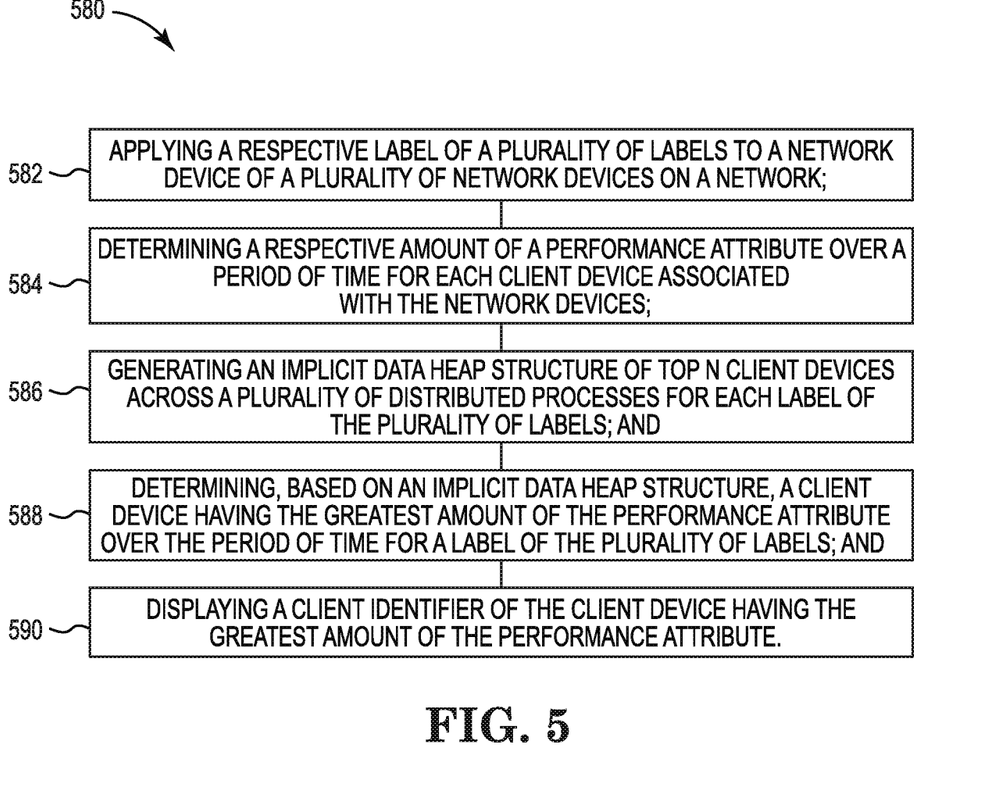
FIG. 5 illustrates an example of a method consistent with the disclosure.

FIG. 5 illustrates an example of a method 580 consistent with the disclosure. Method 580 can be performed by a network device (e.g., network devices 102, 202, described in connection with FIGS. 1 and 2, respectively), a client device (e.g., client devices 106 described in connection with FIG. 1), and/or a different device.

At 582, the method 580 can include applying a respective label of a plurality of labels to a network device of a plurality of network devices on a network, as described herein. At 584, the method 580 can include determining a respective amount of a performance attribute over a period of time for each client device associated with the network devices, as described herein.

At 586, the method 580 can include generating an implicit data heap structure of top N client devices across a plurality of distributed processes for each label of the plurality of labels, as described herein. At 588, the method 580 can include determining, based on an implicit data heap structure, a client device having the greatest amount of the performance attribute over the period of time for a label of the plurality of labels, as described herein. At 590, the method 580 can include displaying a client identifier of the client device having the greatest amount of the performance attribute, as described herein.

Method 580 can be repeated. In some examples, method 580 can be repeated periodically, upon request such as request from a user/network administrator, and/or responsive to a change in a network condition. For instance, a change in a network condition can occur for a new client device in response to the new client device associating with a network device. In some examples, method 580 can be repeated after a threshold period of time, although examples of the disclosure are not limited to repeating method 580 for an existing client device after a threshold period of time.

Figure 6:
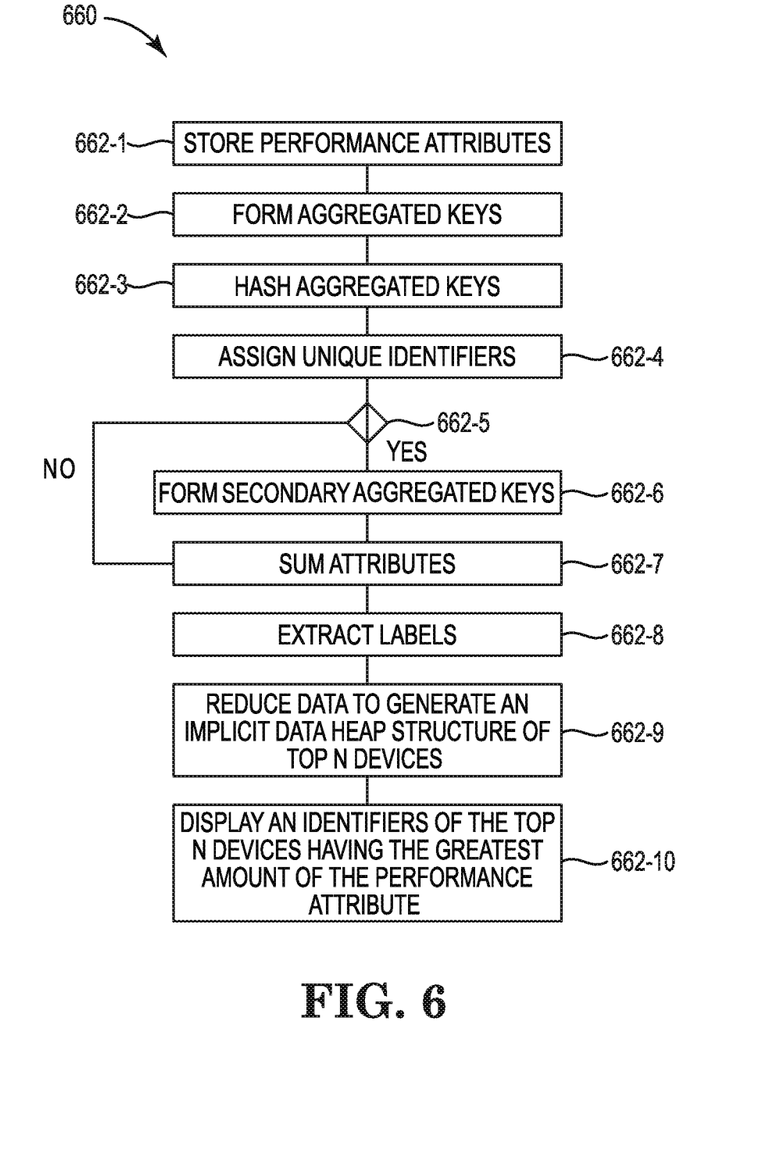
FIG. 6 illustrates an example of a method flow diagram consistent with the disclosure.

FIG. 6 illustrates an example of a method flow diagram 660 consistent with the disclosure. As mentioned, performance attributes of network devices and/or client devices and be determined. Responsive to such determination the performance attributes can be stored. That is, as illustrated at 662-1 storage of performance attributes can occur. Table 1 illustrates an example of client devices having labels for a period of time and determined performance attributes (data usage) for the period of time. For example, the data usage can be an amount of data used by a client device corresponding to a particular client device identifier over a particular period of time and/or at a given point of time. That is, a label propagated to a client device (e.g., ClientC) can change over time (e.g., from Label 2, Label 1) to (Label 4) a different point in time. For instance, as a client device moves from an access point to a different access point a label of the client device can change, among other possibilities.

TABLE 1

| Client device identifiers | Associated labels | Usage |
|---|---|---|
| ClientA | Label1, Label3 | 200 MB |
| ClientB | Label1, Label2 | 100 MB |
| ClientC | Label3, Lable1 | 200 MB |
| ClientA | Label1, Lable4 | 100 MB |
| ClientB | Label2, Label1 | 200 MB |
| ClientC | Label3, Lable2 | 150 MB |
| ClientC | Label4 | 450 MB |

At 662-2 aggregated keys can be formed. An aggregated key can be formed for each client device of the plurality of client device and/or each network device of a plurality of network devices. In the case of client devices, the aggregated key can include (i) a client identifier and (ii) a label. Similarly, in the case of network devices the aggregated key can include (i) a network device identifier and (ii) a label. In some examples, the aggregated key can include a plurality of labels.

In the case of a client device, an example format of aggregated keys can be:

Aggregated Key 1—(ClientA, Label1, group1, swarm200—usage 500 MB); and

Aggregated Key 2—(ClientB, Label2, group1, swarm200—usage 500 MB), where "ClientA and ClientB" are the client device identifiers, "group 1" and "swarm 200" are examples of labels, and "usage 200 MB" is an example an amount of a performance attribute (data usage). That is, the aggregated key and a respective performance attribute are paired together. Notably, aggregated keys and respective performance attribute value pairs can be formed for a plurality of process simultaneously, in contrast to other approaches that may be limited to an individual process.

At 662-3 the aggregated keys (formed at 662-2) can be hashed. In various examples, the aggregated keys can be input into a hash table to reorder and/or otherwise reorganize the aggregated keys and/or information in the aggregated keys. For instance, within each process of a plurality of process a sum can be performed for a respective aggregated key using a hash table. A sum could be performed in O(N) where N is a number of data read, among other possibilities.

At 662-4 unique identifiers can be assigned. For example, unique identifiers can be assigned unique keys to each process of the distributed processes. For example, a unique key always goes to same process and then do a sum for the unique key. That is, a unique key which was present across multiple process can be shuffled or otherwise moved (i.e., split) to ensure all instances of the unique key are in an individual process, and no longer spread across multiple process. Formation of unique keys can be performed in O(N) where N is number of unique keys which is different from the number of data read, among other possibilities to reduce the data read to have unique keys.

At 662-5 it can be determined whether an aggregated key exists that includes a plurality of labels. If no, the method 660 can proceed to 662-7. If yes, the method can proceed to 662-6.

At 662-6, resultant aggregated keys can be formed. For instance, resultant aggregated keys can be formed for each aggregated key having a plurality of labels. That is, a total number of resultant aggregated keys for a respective aggregated key is equal to a total number of the labels in the aggregated key. An example of an aggregated key with a plurality of labels, and the resultant aggregated keys is shown below.

For example, an aggregated key with two labels—"ClientA, label1, label2—300 MB" will be transformed into two resultant aggregated keys:

Resultant aggregated key 1—[ClientA, L, Label1]—300 MB; and

Resultant aggregated key 2—[ClientA, L, Label2]—300 MB.

Notably, the client identifier for the two resultant aggregated keys is different (than that of the aggregated key including a plurality of labels) due to the addition of modifier ("L") to ensure the resultant aggregated keys have a unique client identifier for each label to avoid a name clash. Once all aggregated keys include only an individual label then the method can proceed to 662-7.

At 662-7, the method can sum performance attributes. For instance, the method can sum respective amounts of a performance attributes for aggregated keys that have a common label and a common client identifier but are in different processes. For example:

After 662-3, Process 1—ClientA, Label1, Label3—200 MB

Process 2—ClientA, Label1, Label4—100 MB

Where 200 MB and 100 MB are an example of a performance attribute (e.g., a total amount of data rx and tx) by a ClientA in a first process (Process 1) and a second process (Process 2). Then at 662-6 this will become:

Process1 ClientA, L, Label1—200 MB

ClientA, L, Label3—200 MB

Process 2 Client A, L, Label1—100 MB

ClientA, L, Label4—100 MB

At 662-7 this will become:

Process 1 ClientA, Label1—300 MB (adding from process 2)

Process 2 ClientA, Label3—200 MB.

Notably, the above method can be performed in O(N) where N is number of clients * a number of performance attributes associated with the number of clients.

Once the performance attributes have been summed at 662-7 the method can proceed to 662-8. At 662-8, the method can extract labels from the summed values. For example, ClientA, Label1—200 MB; and ClientB, Label3—400 MB; have labels extracted to transform to:

Label 1->(ClientA, 200 MB); and

Label 2->(ClientB, 400 MB).

At 662-9 the method can include performing a reduce on a total number of aggregated keys for each label of the plurality of labels to generate an implicit data heap structure. In various examples, a top N function can be performed to reduce the data and generate the implicit data heap structure. As used herein, a top N function refers to a function to return only the top N rows of a specified table. For example, if N=3 for:

Label 1->(ClientA, 400 MB);
Group 1->(ClientB, 100 MB);
Label 1->(ClientC, 500 MB); and
Label 1->(ClientD, 200 MB), then after 662-8 this will become Label1->(ClientC, 500 MB), (ClientA, 400 MB), (ClientD, 200 MB). Similar results can be performed for each label/group of a plurality of labels/groups. In the above example, a set of devices having the greatest amounts of a performance attribute such as client devices (ClientC, ClientA, and ClientB) can be determined, whereas other client device (not illustrated) are not included in the set due to having a different (e.g., lower) amount of the performance attribute. While the above example sets N=3, it is understood that fewer or greater devices can be determined by varying a value of N. Moreover, as mentioned the disclosure is not limited to client devices but can be performed with respect to network devices or other types of devices.

At 662-10, the method can include displaying an identifier such as identifiers of the top N devices having the greatest amount of the performance attribute, as described herein. Based on the displayed identifier, various network changes can be made. For instance, client devices can be steered to different network devices (e.g., access points), devices such as network devices can be added to a network, bandwidth can be adjusted, and/or devices can be reorganized/re-grouped, among other possibilities.

In the foregoing detailed description of the disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the disclosure.

The figures herein follow a numbering convention in which the first digit corresponds to the drawing figure number and the remaining digits identify an element or component in the drawing. Similar elements or components between different figures can be identified by the use of similar digits. For example, 102 can reference element "02" in FIG. 1, and a similar element can be referenced as 202 in FIG. 2. Elements shown in the various figures herein can be added, exchanged, and/or eliminated so as to provide a plurality of additional examples of the disclosure. In addition, the proportion and the relative scale of the elements provided in the figures are intended to illustrate the examples of the disclosure and should not be taken in a limiting sense. As used herein, the designator "N", particularly with respect to reference numerals in the drawings, indicates that a plurality of the particular feature so designated can be included with examples of the disclosure. The designators can represent the same or different numbers of the particular features. Further, as used herein, "a plurality of" an element and/or feature can refer to more than one of such elements and/or features.

What is claimed:

1. A method comprising:
    applying a respective label of a plurality of labels to a network device of a plurality of network devices on a network wherein the respective label is propagated to each client device associated with the network device;
    determining a respective amount of a performance attribute over a period of time for each client device associated with the network device;
    generating an implicit data heap structure of top N client devices simultaneously across a plurality of distributed processes for each label of the plurality of labels; and
    determining, based on an implicit data heap structure, a client device having the greatest amount of the performance attribute over the period of time for a label of the plurality of labels;
    displaying a client identifier of the client device having the greatest amount of the performance attribute;
    forming an aggregated key for each client device associated with the network device, wherein the aggregated key includes a client identifier and a label;
    organizing the aggregated keys for each process of the plurality of distributed processes using a hash table;
    assigning unique keys to each process of the distributed processes;
    forming resultant aggregated keys for each aggregated key having a plurality of labels, wherein a total number of resultant aggregated keys for an aggregated key is equal to a total number of the labels in the aggregated key; and
    adding a modifier to the client identifier in the aggregated key to each resultant aggregated key to ensure that each resultant aggregated key has a unique client identifier.

2. The method of claim 1, further comprising:
    storing respective amounts of the performance attribute as time series data in a database; and
    determining a respective amount of a performance attribute over a period of time for the times series data of each client device associated with the network devices.

3. The method of claim 1, wherein the performance attribute corresponds to an amount of data usage, an amount of latency, a packet drop rate, or combinations thereof.

4. The method of claim 1, further comprising forming an aggregated key for the period of time.

5. The method of claim 4, wherein the aggregated key includes each of:
    (i) a client identifier; and
    (ii) a label.

6. The method of claim 5, further comprising forming an aggregated key for each client device of the plurality of client device.

7. The method to claim 1, wherein the labels correspond to a group, a swarm, a site, different areas in site, a user role, and combinations thereof.

8. The method of claim 1, further determining a respective amount of a performance attribute for each network device of the plurality of network device.

9. The method of claim 1, further comprising determining, based on the implicit data heap structure, the client device having a greatest amount of the performance attribute over the period of time for each label of the plurality of labels.

10. The method of claim 1, further comprising applying a respective label of a plurality of labels to each network device of the plurality of network device on the network.

11. A non-transitory computer-readable medium storing instructions executable by a processing resource to:
    for each client device of a plurality of client devices across a plurality of distributed processes that are associated with network devices on a network, propagate a label from a network device to a client device associated with the network device;

determine a respective amount of a performance attribute for each client device associated with the network devices over a period of time;

generate an implicit data heap structure of top N client devices across a plurality of distributed processes for each label of the plurality of labels; and determine, based on an implicit data heap structure, a set of client devices having the greatest amounts of the performance attribute over the period of time for each label of the plurality of labels;

display client identifiers of the set of client devices having the greatest amounts of the performance attribute;

form an aggregated key for each client device of the plurality of client devices, wherein the aggregated key includes a client identifier and a label;

organize the aggregated keys for each process of the plurality of distributed processes using a hash table;

assign unique keys to each process of the distributed processes;

form resultant aggregated keys for each aggregated key having a plurality of labels, wherein a total number of resultant aggregated keys for an aggregated key is equal to a total number of the labels in the aggregated key; and add a modifier to the client identifier in the aggregated key to each resultant aggregated key to ensure that each resultant aggregated key has a unique client identifier.

12. The medium of claim 11, wherein the instructions further comprise instructions to sum respective amounts of a performance attributes for aggregated keys that have a common label and a common client identifier but are in different processes of the plurality of distributed processes.

13. The medium of claim 12, herein the instructions further comprise instructions to extract the label from each aggregated key.

14. The medium of claim 13, wherein the instructions further comprise instructions to reduce a total number of aggregated keys for each label of the plurality of labels to generate the implicit data heap.

15. A system including:
a processing resource; and
a non-transitory computer-readable medium storing instructions executable by the processing resource to:

apply a respective label of a plurality of labels to a network device of a plurality of network devices on a network, wherein the respective label is propagated to a client device associated with the network device;

over a period of time, determine a respective amount of a performance attribute of:
the plurality of network devices; and
client devices associated with the network devices;

generate an implicit data heap structure of top N client devices or network devices simultaneously across a plurality of distributed processes for each label of the plurality of labels;

determine, based on the implicit data heap structure, a set of client devices or a set of network devices having a greatest amount of the performance attribute over the period of time for a label of the plurality of labels;

display client identifiers for the top N client devices or network devices having the greatest amounts of the performance attribute;

form an aggregated key for each client device of the client devices associated with the network devices, wherein the aggregated key includes a client identifier and a label;

organize the aggregated keys for each process of the plurality of distributed processes using a hash table;

assign unique keys to each process of the distributed processes;

form resultant aggregated keys for each aggregated key having a plurality of labels, wherein a total number of resultant aggregated keys for an aggregated key is equal to the total number of the labels in the aggregated key; and add a modifier to the client identifier in the aggregated key to each resultant aggregated key to ensure that each resultant aggregated key has a unique client identifier.

16. The system of claim 15, further comprising instruction to periodically determine, based on an implicit data heap structure, a set of client devices or a set of network devices having a greatest amount of the performance attribute over the period of time for a label of the plurality of labels.

* * * * *